US008142755B2

(12) United States Patent
Huang et al.

(10) Patent No.: US 8,142,755 B2
(45) Date of Patent: Mar. 27, 2012

(54) POROUS COPPER SULFIDE NANO/MICRO HOLLOW SPHERE AND METHOD FOR PREPARING THE SAME

(75) Inventors: Chi-Yuan Huang, Taipei (TW); Yen-Hung Chen, Taipei (TW); Chen-Jing Yu, Taipei (TW)

(73) Assignee: Tatung Company and Tatung University (TW)

( * ) Notice: Subject to any disclaimer, the term of this patent is extended or adjusted under 35 U.S.C. 154(b) by 0 days.

(21) Appl. No.: 13/287,326

(22) Filed: Nov. 2, 2011

(65) Prior Publication Data

US 2012/0045387 A1   Feb. 23, 2012

Related U.S. Application Data

(62) Division of application No. 12/314,101, filed on Dec. 4, 2008.

(30) Foreign Application Priority Data

Mar. 21, 2008   (TW) ................................. 97110014 A

(51) Int. Cl.
  *C01G 1/12*   (2006.01)
  *C01G 3/12*   (2006.01)
(52) U.S. Cl. ...................... 423/561.1; 977/773; 977/775; 977/777
(58) Field of Classification Search ............... 423/561.1; 977/773, 775, 777
  See application file for complete search history.

(56) References Cited

U.S. PATENT DOCUMENTS

2005/0181206 A1* 8/2005 Endo et al. ................... 428/364
2010/0180932 A1* 7/2010 Wang et al. .................. 136/246

* cited by examiner

*Primary Examiner* — Timothy Vanoy
(74) *Attorney, Agent, or Firm* — Bacon & Thomas, PLLC

(57) ABSTRACT

The present invention relates to a porous copper sulfide nano/micro hollow sphere and a method for preparing the same. The porous copper sulfide nano/micro hollow sphere of the present invention has plural through holes and a hollow structure so as to increase the reactive area thereof. In particular, the porous copper sulfide nano/micro hollow sphere can be applied in a solar cell to enhance a photoelectric effect.

20 Claims, 1 Drawing Sheet

POROUS COPPER SULFIDE NANO/MICRO HOLLOW SPHERE AND METHOD FOR PREPARING THE SAME

This application is a divisional application of pending U.S. patent application Ser. No. 12/314,101, filed Dec. 4, 2008 (of which the entire disclosure of the pending, prior application is hereby incorporated by reference).

BACKGROUND OF THE INVENTION

1. Field of the Invention

The present invention relates to porous copper sulfide nano/micrometer hollow spheres and a method for preparing the same, more particularly, to porous copper sulfide nano/micrometer hollow spheres that have an increased specific surface area and a method for preparing the same.

2. Description of Related Art

Copper sulfide is a good prospective optoelectronic material. It has potential applications in solar cells, electrochemistry cells, IR detectors, catalysts and so on. For these applications, copper sulfide has been a widely studied material. At room temperature, copper sulfide ($Cu_xS$) can form five stable phases: covellite (x=1), anilite (x=1.75), digenite (x=1.8), djurleite (x=1.95) and chalcosite (x=2). In addition, a variety of techniques have been developed to prepare copper sulfides with nano/micrometerstructural morphologies due to the development and wide application of nano/micrometer technologies.

Since both microstructural size and shape of materials sensitively influence their optical, electrical and catalytic properties, the technology for controlling the microstructural size and shape of copper sulfides has attracted significant interest of researchers skilled in the art. So far, various microstructural morphologies of copper sulfides have been developed, such as solid spheres, hollow spheres, thin films, rods and arbitrary morphologies. Although copper sulfides with the aforementioned microstructural morphologies can present their own advantages in certain applications, the further improvement in the term of their properties is still desirable.

Accordingly, the present invention provides copper sulfide with a novel nano/micrometerstructural morphology to increase the reactive area of copper sulfide and enhance the application efficiency thereof. In particular, when the copper sulfide according to the present invention is applied in solar cells, the photoelectric effect of the solar cells can be enhanced owing to the novel nano/micrometerstructural morphology thereof so as to enhance the development potency of solar cells.

SUMMARY OF THE INVENTION

The object of the present invention is to provide a porous copper sulfide nano/micrometer hollow sphere and a method for preparing the same. The porous copper sulfide nano/micrometer hollow sphere of the present invention has plural through holes and a hollow structure so as to increase the specific surface area thereof. In particular, the porous copper sulfide nano/micrometer hollow sphere can be applied in a solar cell to enhance a photoelectric effect.

To achieve the object, the present invention provides a porous copper sulfide $Cu_xS$ nano/micrometer hollow sphere having a diameter in a range of about 300 nm to 700 nm and a plurality of through holes. Herein, x is in a range of 1 to 2. Accordingly, based on the porous hollow sphere structure, the reactive area of copper sulfide increases and the application efficiency of copper sulfide in solar cells, electrochemistry cells, IR detectors or catalysts can be enhanced. For example, when the copper sulfide nano/micrometer hollow sphere according to the present invention is applied in solar cells, the photoelectric effect can be enhanced owing to the porous hollow sphere structure thereof.

By suitable control over the condition of reaction, the through holes of the porous copper sulfide nano/micrometer hollow sphere can have polygon-like cross sections (such as pentagon, hexagon), and the average distance between adjacent through holes can be in a range of about 5 nm to 30 nm. In addition, the average diameter of the through holes can be in a range of 80 nm to 130 nm.

In addition, the present invention further provides a method for preparing the aforementioned porous copper sulfide nano/micrometer hollow sphere, comprising: mixing a copper source solution and a chelating agent to form a mixture solution; and adding a first sulfur-based reducing agent and a second sulfur-based reducing agent into the mixture solution in sequence to perform reaction for a period in a range of 5 to 600 seconds at a temperature in a range of 60° C. to 100° C. Herein, the reducing power of the first sulfur-based reducing agent is larger than that of the second sulfur-based reducing agent. According to the aforementioned process, porous copper sulfide nano/micrometer hollow spheres can be provided. In addition, in order to separate the resultant porous copper sulfide nano/micrometer hollow spheres from the mixture solution, the aforementioned method can further comprise a step for filtrating, washing and drying after the reaction is accomplished.

In the method according to the present invention, the copper source solution can be a copper salt solution or a cuprous salt solution, and the chelating agent can be a bidentate chelating agent, a tridentate chelating agent, a tetradentate chelating agent or a hexadentate chelating agent. Preferably, the bidentate chelating agent is $HOOC-(CR_1R_2)_n-COOH$ or $R_3R_4N-(CR_1R_2)_n-NR_3'R_4'$; the tridentate chelating agent is $NR_3R_4-(CR_1R_2)_n-NR_5R_6-(CR_1'R_2')_m-NR_3'R_4'$, $R_3N((CR_1R_2)_nCOOH)_2$ or $R_3N((CR_1R_2)_nOH)_2$; the tetradentate chelating agent is $N((CR_1R_2)_nCOOH)_3$ or $N((CR_1R_2)_nOH)_3$; and the hexadentate chelating agent is $_2(HOOC-(CR_3R_4)_n)N-(CR_1R_2)_m-N((CR_3'R_4')_r-COOH)_2$. Herein, $R_1$, $R_1'$, $R_2$, $R_2'$, $R_3$, $R_3'$, $R_4$, $R_4'$, $R_5$ and $R_6$ each independently are hydrogen or C1-6 alkyl, and m, n and r each independently are an integer between 1 to 6. For example, the bidentate chelating agent can be ethylmalonic acid, N,N-dimethylethylenediamine, trimethylenediamine or ethylenediamine; the tridentate chelating agent can be diethanolamine, diethylenetriamine or aminodiacetic acid; the tetradentate chelating agent can be triethanolamine or ammoniatriacetic acid; and the hexadentate chelating agent can be ethylenediamine tetraacetic acid or ethylenediaminetetrapropionic acid.

In the method according to the present invention, preferably, the chelating agent is a bidentate chelating agent. More preferably, the chelating agent is $R_3R_4N-(CR_1R_2)_n-NR_3'R_4'$. Herein, $R_1$, $R_2$, $R_3$, $R_3'$, $R_4$ and $R_4'$ are defined as above.

In the method according to the present invention, preferably, the first sulfur-based reducing agent is sodium hydrogen sulfite or sodium sulfide, and the second sulfur-based reducing agent is sodium sulfide or sodium thiosulfate.

In the method according to the present invention, preferably, the concentration of the copper source solution is in a range of 0.05M to 1.00M; the concentration of the chelating agent in the mixture solution is in a range of 0.05M to 1.00M; the concentration of the first sulfur-based reducing agent in the mixture solution is in a range of 0.05M to 1.00M; and the concentration of the second sulfur-based reducing agent in the mixture solution is in a range of 0.05M to 1.00M.

Accordingly, the porous copper sulfide nano/micrometer hollow sphere according to the present invention has an increased reactive area and enhanced application efficiency in solar cells, semiconductors, catalysts and so on. In particular, the porous copper sulfide nano/micrometer hollow sphere can be applied in a solar cell to enhance a photoelectric effect. In addition, the porous hollow sphere structure has reduced weight per unit area, and thereby the usage of the porous copper sulfide nano/micrometer hollow spheres in products can meet the requirement of being lightweight.

Other objects, advantages, and novel features of the invention will become more apparent from the following detailed description when taken in conjunction with the accompanying drawings.

DETAILED DESCRIPTION OF THE PREFERRED EMBODIMENT

Example 1

0.05 M of copper sulfide solution ($CuSO_4.5H_2O$) is prepared and heated until the temperature reaches 65° C. Then, at the same temperature, ethylenediamine is added into the copper sulfide solution and stirred to form a mixture solution. Herein, the concentration of ethylenediamine in the mixture solution is 0.05 M. Subsequently, sodium hydrogen sulfite and sodium sulfide are added in the mixture solution in sequence to perform reaction for about 5 seconds at 65° C. Herein, the concentrations of sodium hydrogen sulfite and sodium sulfide in the mixture solution are 0.05 M, respectively. After the reaction is accomplished, a powder-like product is obtained by filtration, deionized water washing and drying.

Example 2

0.5 M of copper sulfide solution ($CuSO_4.5H_2O$) is prepared and heated until the temperature reaches 75° C. Then, at the same temperature, ethylenediamine is added into the copper sulfide solution and stirred to form a mixture solution. Herein, the concentration of ethylenediamine in the mixture solution is 0.5 M. Subsequently, sodium hydrogen sulfite and sodium thiosulfate are added in the mixture solution in sequence to perform reaction for about 3 minutes at 75° C. Herein, the concentrations of sodium hydrogen sulfite and sodium thiosulfate in the mixture solution are 0.5 M, respectively. After the reaction is accomplished, a powder-like product is obtained by filtration, deionized water washing and drying.

Example 3

1.0 M of cuprous chloride solution (CuCl) is prepared and heated until the temperature reaches 95° C. Then, at the same temperature, ethylenediamine is added into the cuprous chloride solution with stirring to form a mixture solution. Herein, the concentration of ethylenediamine in the mixture solution is 1.0 M. Subsequently, sodium sulfide and sodium thiosulfate are added in the mixture solution in sequence to perform reaction for about 10 minutes at 95° C. Herein, the concentrations of sodium sulfide and sodium thiosulfate in the mixture solution are 1.0 M, respectively. After the reaction is accomplished, a powder-like product is obtained by filtration, deionized water washing and drying.

Figure 1:
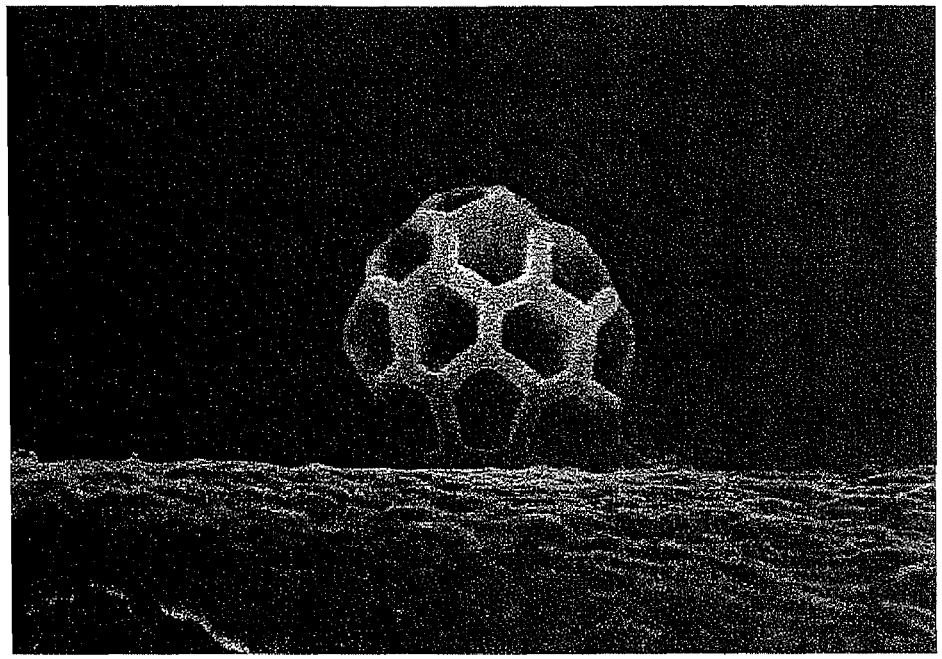
FIG. 1 is a scanning electron microscope image of a single porous copper sulfide nano/micrometer hollow sphere provided by the present invention, where the scale bar is 500 nm.
Figure 2:
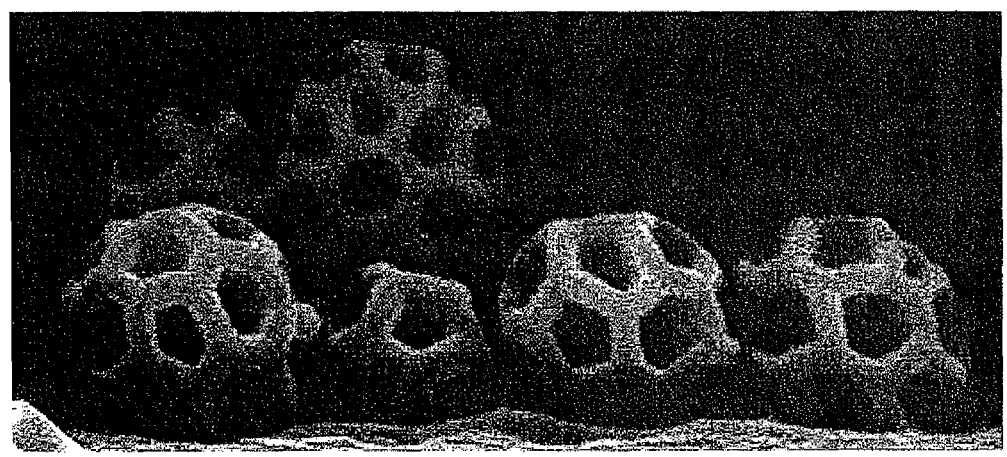
FIG. 2 is a scanning electron microscope image of plural porous copper sulfide nano/micrometer hollow spheres provided by the present invention.

The microstructure of the resultant products by the aforementioned process is observed under a scanning electron microscope (SEM). As shown in FIGS. 1 and 2, porous copper sulfide $Cu_xS$ (x is in a range of 1 to 2) nano/micrometer hollow spheres are obtained, which have a diameter in a range of about 300 nm to 700 nm and through holes. The through holes have polygon-like cross sections, and the average distance between adjacent through holes is in a range of about 80 nm to 130 nm.

Accordingly, the porous copper sulfide nano/micrometer hollow sphere according to the present invention can be applied in solar cells, semiconductors, catalysts and so on to enhance the performance. In particular, the porous copper sulfide nano/micrometer hollow sphere can be applied in a solar cell to enhance a photoelectric effect. In addition, the porous hollow sphere structure has reduced weight per unit area, and thereby the usage of the porous copper sulfide nano/micrometer hollow spheres in products can meet the requirement of being lightweight.

Although the present invention has been explained in relation to its preferred embodiment, it is to be understood that many other possible modifications and variations can be made without departing from the scope of the invention as hereinafter claimed.

What is claimed is:

1. A method for preparing a porous copper sulfide $Cu_xS$ nano/micrometer hollow sphere, comprising:
   mixing a copper source solution and a chelating agent to form a mixture solution; and
   adding a first sulfur-based reducing agent and a second sulfur-based reducing agent into the mixture solution in sequence to perform reaction for a period in a range of 5 to 600 seconds at a temperature in a range of 60° C. to 100° C.,
   wherein x is in a range of 1 to 2 and the reducing power of the first sulfur-based reducing agent is larger than that of the second sulfur-based reducing agent.

2. The method as claimed in claim 1, further comprising a step for filtrating, washing and drying after the reaction is accomplished.

3. The method as claimed in claim 1, wherein the copper source solution is a copper salt solution or a cuprous salt solution.

4. The method as claimed in claim 1, wherein the chelating agent is a bidentate chelating agent, a tridentate chelating agent, a tetradentate chelating agent or a hexadentate chelating agent.

5. The method as claimed in claim 4, wherein the bidentate chelating agent is HOOC—$(CR_1R_2)_n$—COOH or $R_3R_4N$—$(CR_1R_2)_n$—$NR_3'R_4'$, $R_1$, $R_2$, $R_3$, $R_3'$, $R_4$ and $R_4'$ each independently are hydrogen or C1-6 alkyl, and n is an integer between 1 to 6.

6. The method as claimed in claim 4, wherein the bidentate chelating agent is ethylmalonic acid, N,N-dimethylethylenediamine, trimethylenediamine or ethylenediamine.

7. The method as claimed in claim 4, wherein the tridentate chelating agent is $NR_3R_4$—$(CR_1R_2)_n$—$NR_5R_6$—

$(CR_1'R_2')_m$—$NR_3'R_4'$, $R_3N((CR_1R_2)_nCOOH)_2$ or $R_3N((CR_1R_2)OH)_2$, $R_1$, $R_1'$, $R_2$, $R_2'$, $R_3$, $R_3'$, $R_4$, $R_4'$, $R_5$ and $R_6$ each independently are hydrogen or C1-6 alkyl, and m and n each independently are an integer between 1 to 6.

8. The method as claimed in claim 4, wherein the tridentate chelating agent is diethanolamine, diethylenetriamine or aminodiacetic acid.

9. The method as claimed in claim 4, wherein the tetradentate chelating agent is $N((CR_1R_2)_nCOOH)_3$ or $N((CR_1R_2)_nOH)_3$, $R_1$ and $R_2$ each independently are hydrogen or C1-6 alkyl, and n is an integer between 1 to 6.

10. The method as claimed in claim 4, wherein the tetradentate chelating agent is triethanolamine or ammoniatriacetic acid.

11. The method as claimed in claim 4, wherein the hexadentate chelating agent is $_2(HOOC$—$(CR_3R_4)_n)N$—$(CR_1R_2)_m$—$N((CR_3'R_4')_rCOOH)_2$, $R_1$, $R_2$, $R_3$, $R_3'$, $R_4$ and $R_4'$ each independently are hydrogen or C1-6 alkyl, and m, n and r each independently are an integer between 1 to 6.

12. The method as claimed in claim 4, wherein the hexadentate chelating agent is ethylenediamine tetraacetic acid or ethylenediaminetetrapropionic acid.

13. The method as claimed in claim 1, wherein the chelating agent is a bidentate chelating agent.

14. The method as claimed in claim 1, wherein the chelating agent is $R_3R_4N$—$(CR_1R_2)_n$—$NR_3'R_4'$, $R_1$, $R_2$, $R_3$, $R_3'$, $R_4$ and $R_4'$ each independently are hydrogen or C1-6 alkyl, and n is an integer between 1 to 6.

15. The method as claimed in claim 1, wherein the first sulfur-based reducing agent is sodium hydrogen sulfite or sodium sulfide, and the second sulfur-based reducing agent is sodium sulfide or sodium thiosulfate.

16. The method as claimed in claim 1, wherein the concentration of the copper source solution is in a range of 0.05M to 1.00M.

17. The method as claimed in claim 1, wherein the concentration of the chelating agent in the mixture solution is in a range of 0.05M to 1.00M.

18. The method as claimed in claim 1, wherein the concentration of the first sulfur-based reducing agent in the mixture solution is in a range of 0.05M to 1.00M.

19. The method as claimed in claim 1, wherein the concentration of the second sulfur-based reducing agent in the mixture solution is in a range of 0.05M to 1.00M.

20. The method as claimed in claim 1, wherein the porous copper sulfide $Cu_xS$ nano/micrometer hollow sphere has a diameter in a range of 300 nm to 700 nm and a plurality of through holes, the average distance between adjacent through holes is in a range of 5 nm to 30 nm, and the average diameter of the through holes is in a range of 80 nm to 130 nm.

\* \* \* \* \*